(12) United States Patent
Zanella et al.

(10) Patent No.: US 6,955,784 B1
(45) Date of Patent: Oct. 18, 2005

(54) HOLLOW COMPOSITE PRODUCTS AND METHOD FOR MAKING SAME

(75) Inventors: Guy Zanella, Cognin (FR); Gilbert Dufayard, Bourget du Lac (FR)

(73) Assignee: Saint-Cobain Vetrotex France S.A., Chambery (FR)

(*) Notice: Subject to any disclaimer, the term of this patent is extended or adjusted under 35 U.S.C. 154(b) by 0 days.

(21) Appl. No.: 09/959,737

(22) PCT Filed: May 4, 2000

(86) PCT No.: PCT/FR00/01211

§ 371 (c)(1),
(2), (4) Date: Jan. 2, 2002

(87) PCT Pub. No.: WO00/66347

PCT Pub. Date: Nov. 9, 2000

(30) Foreign Application Priority Data

May 4, 1999 (FR) .............................. 99 05657

(51) Int. Cl.$^7$ .............................................. B29C 49/22
(52) U.S. Cl. ....................... 264/516; 264/516
(58) Field of Search ........................... 264/516

(56) References Cited

U.S. PATENT DOCUMENTS

| | | | |
|---|---|---|---|
| 5,419,554 A | | 5/1995 | Krone et al. ................ 473/535 |
| 5,795,423 A | * | 8/1998 | Johnson ...................... 156/166 |
| 6,565,793 B1 | * | 5/2003 | Goldsworthy et al. ...... 264/516 |

FOREIGN PATENT DOCUMENTS

| WO | WO 92/12847 | 8/1992 |
|---|---|---|
| WO | WO 98/51481 | 11/1998 |

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

The invention concerns a hollow composite product comprising over 20% glass in the form of long fibres, the thickness of the product walls further ranging between 1 and 10 mm about. The invention also concerns a method for making said product, which consists in inserting in a mould (10) a preheated assembly (9) comprising in its core at least an inflatable pocket covered with at least a composite structure, the composite structure including at least a filler material in the form of long fibres and the preheated assembly including a material capable of creeping, and in inflating the inflatable pocket under pressure higher than 40 bars.

22 Claims, 6 Drawing Sheets

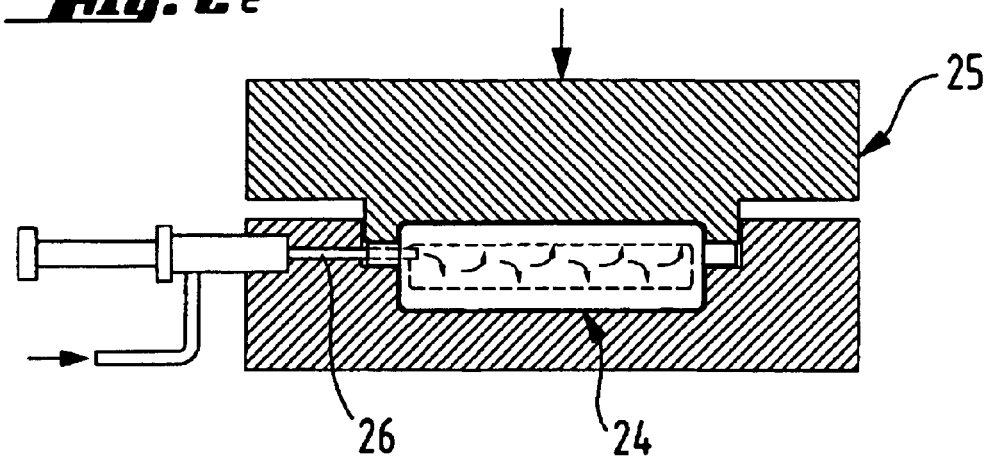
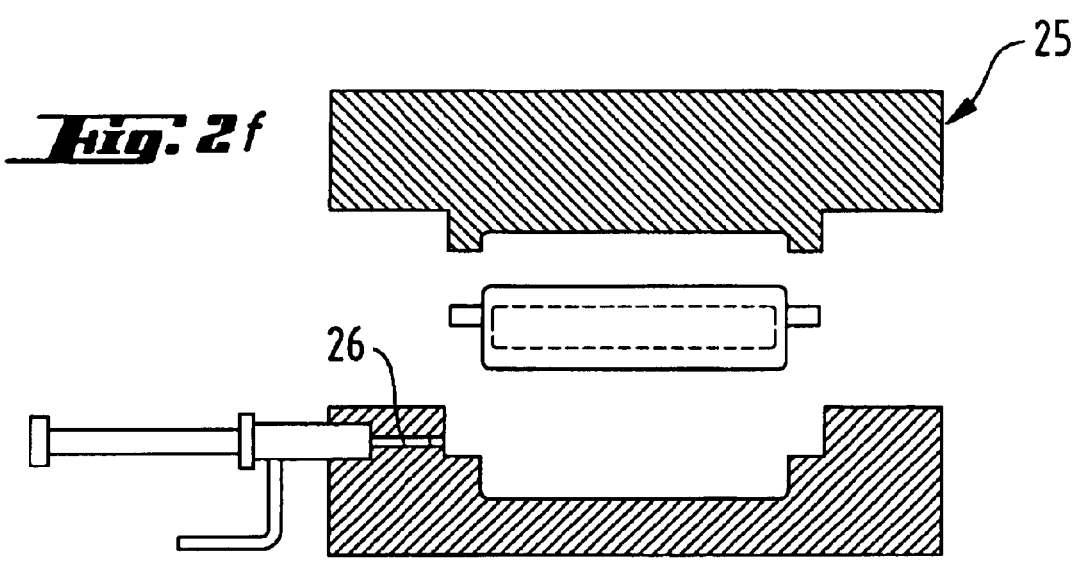

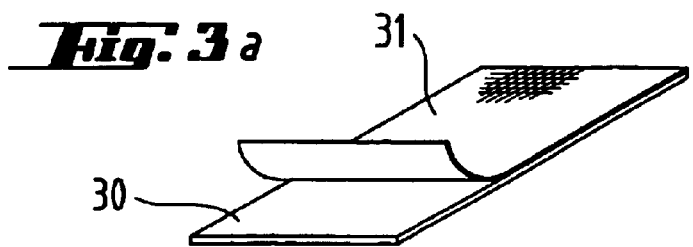
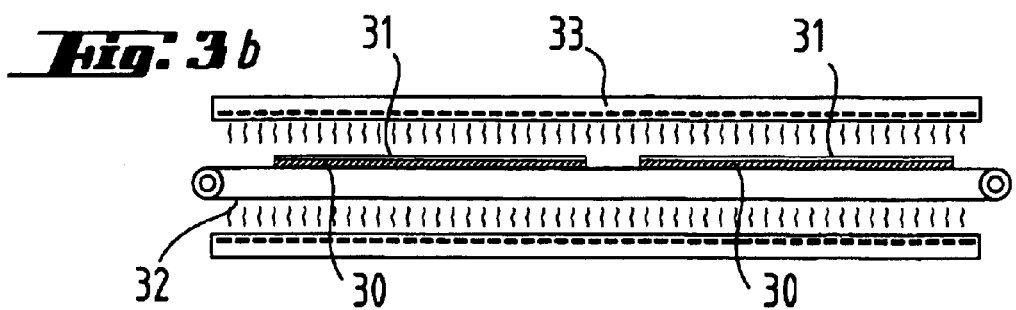
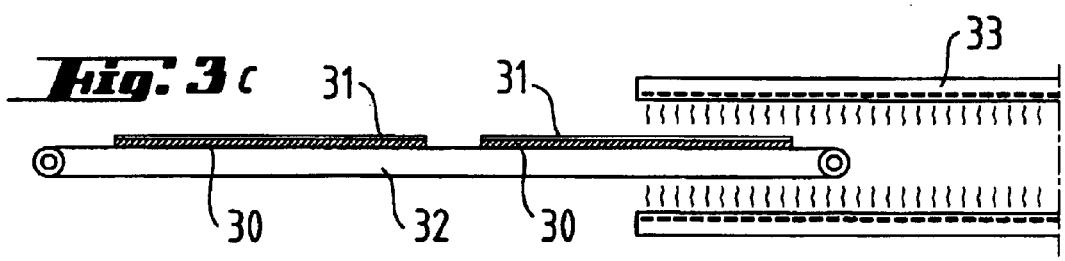
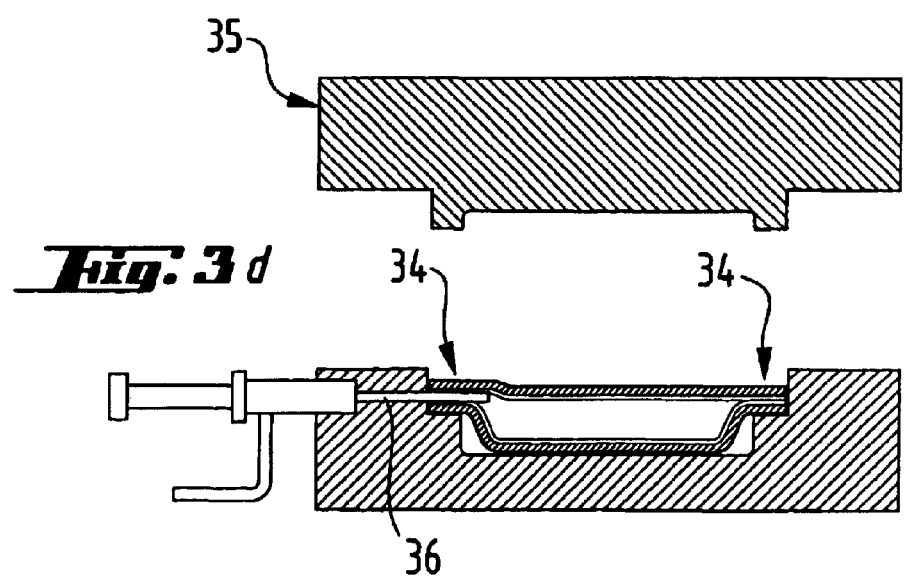

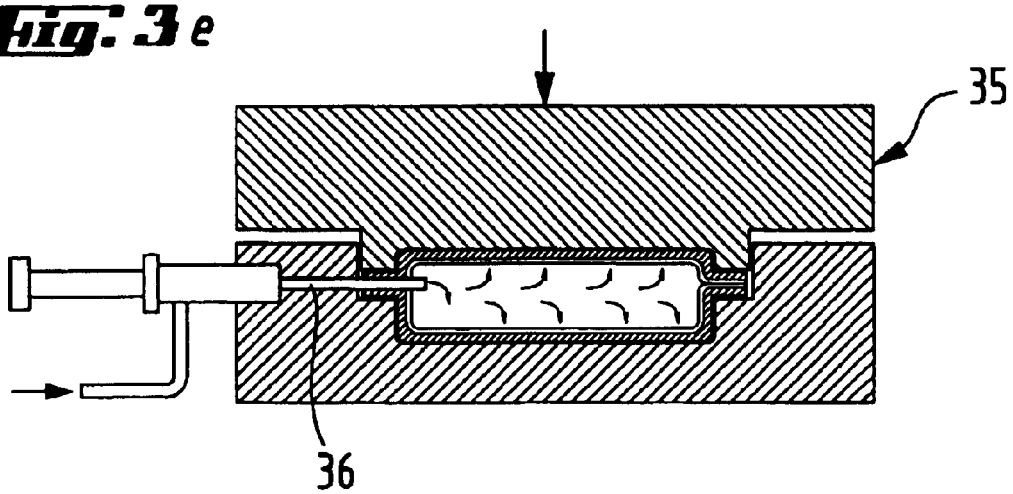
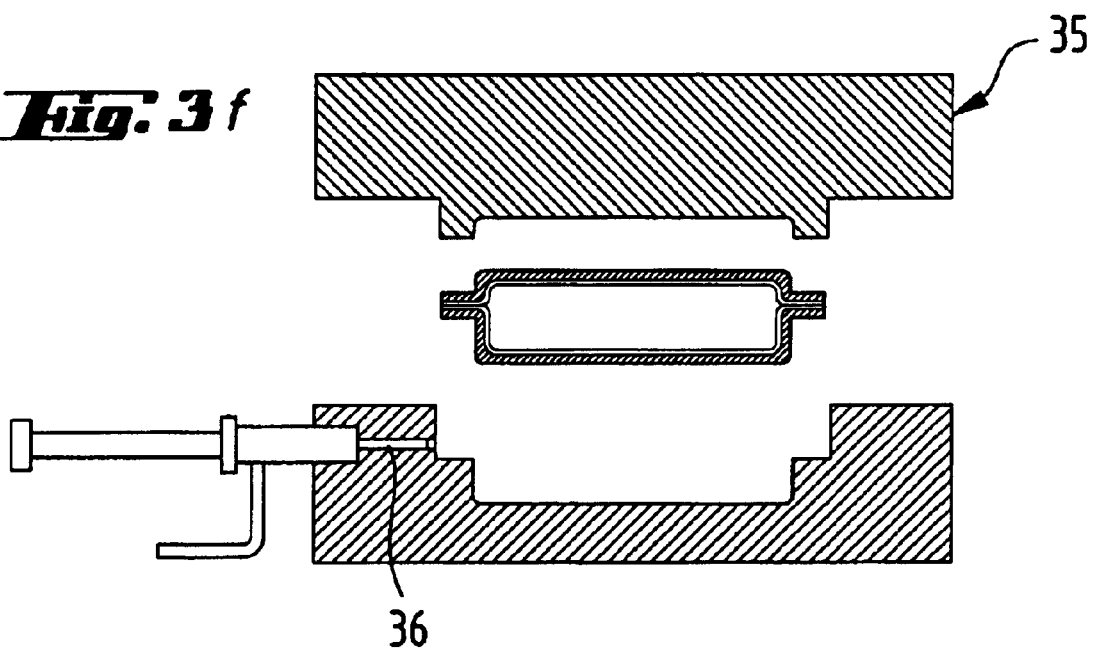
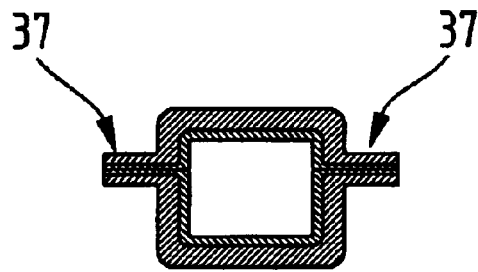

HOLLOW COMPOSITE PRODUCTS AND METHOD FOR MAKING SAME

BACKGROUND OF THE INVENTION

1. Field of the Invention

The present invention relates to novel composite products and to a method for manufacturing these products. The expression "composite product" is to be understood as meaning "a product comprising at least two substances with different melting points" and the term "hollow" product is to be understood as meaning that the product has, inside it, one or more hollow parts surrounded by walls, the hollow part or parts inside the product being empty or filled with one or more filling materials.

2. Discussion of the Background

The composite products are generally solid moulded products obtained by injection or compression 15 moulding in a mould or press. These products may be suitable for various types of application depending on the materials used and the shape.

SUMMARY OF THE INVENTION

The present invention seeks to obtain novel composite products which are particularly suited to use as structural and/or energy-absorbing components (for example as bumper members for motor vehicles, protective spars, energy-absorbers for bumpers, structural components for boats, support girders, etc.). Another object of the invention is to provide a fast and economical method for manufacturing these products.

These objects are achieved first of all by the product according to the invention, this product being a hollow composite product comprising more than 20% by weight of reinforcing substance (preferably glass) in the form of long fibres, the wall thickness of the product (whether these be the outer walls or any possible interior walls which might separate a number of hollow parts of the component) also being between about 1 and 10 mm.

The present invention also relates to a method for manufacturing hollow composite products suited to the manufacture of products according to the invention. In this method, a preheated assembly containing within it at least one inflatable bag is introduced into a mould, this inflatable bag being lined with at least one composite structure comprising at least one reinforcing substance in the form of long fibres and the preheated assembly comprising at least one material capable of flowing and, in this method, the inflatable bag is inflated to a pressure in excess of 40 bar so that the preheated assembly adopts the shape of the mould.

A distinction needs to be drawn between the method according to the invention and methods which already exist for the manufacture of hollow products by blow moulding (for example methods of injection-moulding then blowing or methods in which a thermoplastic parison is extruded before being placed in a mould and blown), these methods employing blowing pressures of below 15 bar and in most cases not exceeding 5 bar. These existing methods, which use different pressures, different treatment steps and different starting materials (not generally including long reinforcing fibres) are not suited to the manufacture of composite products as sought after according to the invention and/or are uneconomical (for example, they employ costly inflatable silicon bladders) and/or are suited only to short production runs (10 to 15 items per day) and/or may also, in the case of some of them, present problems in terms of environmental concerns.

Hollow products comprising long reinforcing fibers are generally obtained by molding in the presence of an inflatable bladder. For example, in WO-A-98/51481, a self-supporting porous preform is used which is introduced into a bladder made of an expansible and flexible membrane covered with a material comprising thermoplastic fibres and hybrid yarns of glass fibres and thermoplastic fibres. The assembly thus formed is placed into a mould, then it is heated while the bladder is simultaneously inflated at a pressure in the order of 0.5 to 1 MPa (5 to 10 bars). Due to the low pressure applied, this process remains limited to the manufacture of hollow products of a not very complex form and of relatively high thickness.

The method according to the invention can be performed manually or can be automated. It is particularly simple and economical, meets concerns of safety and environmental protection and is able to yield components of somewhat complex shape and of varying size. In particular, it is suited to the manufacture of long production or mass-production runs of components (unlike vacuum-moulding or injection blow moulding techniques), it also being possible for this method to be used to produce short production runs of products. The method according to the invention is also fast, and is able to yield hollow composite components in a single moulding operation and makes it possible to envisage the manufacture of components with a high degree of reinforcement. In particular, it makes it possible, in an economically viable way, to obtain components with a reinforcement ratio higher than 40 or 45% by weight approximately, it being possible for these ratios to extend to as high as 75–80%.

The hollow composite product obtained according to the invention generally exhibits between 20 and 80% by weight of reinforcing substance (preferably glass), particularly at least 20% (by weight) of reinforcing substance in the form of long fibres (it being possible for this product to comprise, by way of reinforcements, only long fibres or reinforcements in other forms, for example in the form of short fibres in addition to the long fibres), and has a wall thickness of between about 1 and 10 mm, preferably lower than or equal to 6 mm. Furthermore, in most cases and as a preference, it has a closed cross section (for example circular or rectangular or trapezoidal or square, etc.). This product exhibits good mechanical strength properties for a modest weight, the weight/mechanical strength relationship (or inertia in the event of impact) of this product being more advantageous than that of the same solid product or that of the same product with an open section (for example with a U-section). The product according to the invention has, in particular, good resistance to torsion and bending, while at the same time having a particularly low weight and wall thickness. The wall thickness of the product as defined is economically advantageous while at the same time making it possible to obtain the desired strength properties and also at the same, for producing the product, allowing the use of complex composite structures formed of several layers, as explained later on.

Depending on its end-use, the hollow composite component (or hollow composite product) according to the invention may have a filling material, for example a foam (filling being achieved for example by injecting a cellular polymer in the form of a foam into the component), but the component is preferably empty so that it exhibits a particularly advantageous set of cost/weight/mechanical properties characteristics.

The composite structure used in the method according to the invention is not very thick compared with its surface area, is generally planar but may, if necessary, have sufficient flexibility that it can be collected and stored in coiled form. It may be solid or perforated and advantageously has sufficient robustness (or a sufficiently fixed or bound or rigid structure) that it can be handled and used in the method according to the invention. It may be formed of one or several layers, as explained later on.

The composite structure used in the invention is formed of at least two substances with different melting points. In general, it comprises at least one organic thermoplastic (such as polypropylene, polyethylene, polybutylene terephthalate, polyethylene terephthalate, polyamide, etc.) or thermoset and at least one reinforcing substance (at least partially in the form of fibres, for example natural or synthetic fibres, carbon fibres, aramide fibres, glass fibres, etc.) for reinforcing this organic substance. As a preference, it comprises at least one organic thermoplastic and preferably also comprises at least some glass fibres.

According to the definition of the invention, use is made of a composite structure comprising a reinforcing substance in the form of "long" fibres, that is to say in the form of fibres which are in excess of 1 mm long (as opposed to "short" fibres which are between 0.1 and 1 mm long). More particularly, the "long" fibres mentioned in the present invention are fibres which (in the composite structure ready to be used in the method according to the invention) initially have a length such that their end length (in the finished hollow product obtained after moulding) is longer than 1 mm (this being all the more reason for their initial length to be greater than 1 mm). The long fibres of the composite structure used are, for example, in the form of continuous fibres (several centimeters or meters long) or "chopped" fibres (longer than 1 mm, for example of the order of a few millimeters or centimeters long, these so-called "chopped" fibres also including fibres of the glass staple fibres type). To obtain the products according to the invention, the content of long fibres in the composite structure is also advantageously chosen to be higher than 20% by weight of the structure.

The presence of a reinforcing substance in the form of long fibres is important to limit the risks of perforation and inflammation of the inflatable bag (these phenomena being observed when using only short reinforcing fibres) during moulding and to obtain good mechanical properties (particularly in the case of continuous yarns). The presence of long reinforcing fibres in the structure, particularly continuous yarns, also plays a part in the good integrity of the structure while it is being handled and used, and makes it possible for the structure to be heated and rolled up as required in a number of embodiments of the method according to the invention.

The reinforcing substance or substances (or substance or substances with the higher melting point) in the form of fibres are generally in the form of yarns or filaments (filaments being yarns of a very small diameter, for example of the order of 5 to 24 microns in diameter in the case of glass, these filaments being obtained by drawing threads of molten substance and generally grouped together into one or more yarns of higher diameter). The composite structure may also advantageously comprise at least one organic substance (or a substance with a lower melting point in the more general case) in the form of yarns or filaments; in particular, it is advantageous for the composite structure to comprise at least one assembly or web of yarns comprising filaments or yarns made of organic substance intermingled with and/or inserted among reinforcing filaments or yarns. The composite structure may, in particular, advantageously comprise hybrid yarns obtained by the combining and simultaneous spooling of yarns or filaments of one of the substances and yarns or filaments of the other substance, it being possible for these hybrid yarns to be mixed in the structure with yarns of one of the substances and/or yarns of the other substance.

According to one particularly advantageous embodiment of the invention, the composite structure comprises at least an assembly or web of yarns formed of at least 50% (preferably at least 80% and more particularly preferably 100%) by weight of hybrid yarns. As a preference, these hybrid yarns are so-called "co-mingled" yarns (or "composite yarns"), that is to say yarns made up of filaments of one of the substances and of filaments of the other substance, the filaments being mingled within the yarns (this embodiment being all the more advantageous if the mingling is homogeneous), these yarns generally being obtained by assembling the filaments directly at their time of manufacture (according to the methods described, for example, in Patent Applications EP-A-0,590,695 and EP-A-0,616,055). As a preference, the co-mingled yarns consist of glass filaments and filaments of organic thermoplastic closely mingled.

The advantages due to the use in the method according to the invention of composite structures exhibiting an organic substance in the form of yarns or filaments, especially of structures comprising hybrid yarns, and all the more especially of structures comprising co-mingled yarns (particularly a majority of co-mingled yarns) are, in particular, that the organic substance melts more rapidly, thus allowing an increase in productivity, and that the products obtained are more homogeneous. The use of composite yarns also makes it possible, because of the speed and ease of operation, to produce composite products with higher levels of reinforcement in a more economically viable way.

As indicated earlier, the composite structure advantageously has sufficient robustness that it can be handled and used in the method according to the invention. Also as a preference, it must be readily deformable so as to closely follow the shape of the mould, and in particular the layer or layers or part or parts of the structure including the long reinforcing fibres must be readily deformable.

Thus, for example, the layer or layers or part or parts of the structure including the long reinforcing fibres may be in the form of mats (of continuous or chopped yarns) or loosely woven fabrics (that is to say wovens with a deformable weave, for example knits or wovens of the "jersey" type or wovens with a twill weave). Advantageously according to the invention, the composite structure comprises at least one array of criss-crossed yarns, more particularly comprises an assembly or web of reinforcing yarns or filaments in the form of a woven (or knit), the use of woven(s) in particular making it possible to obtain composite products with good mechanical properties. The same yarns or collections of yarns may be used to form the warp and the weft of the woven or array, or the weft and the warp may consist of different yarns or different combinations of yarns. Thus, the array of yarns may, for example, be in the form of a woven, in which the warp consists of co-mingled yarns of organic substance/reinforcing substance and of which the weft consists of 80 to 100% of yarns of organic substance of the same kind as the co-mingled yarns. This array therefore has a preferential direction of orientation of the reinforcing yarns (uni-directional structure). In an advantageous case of the present invention, the structure comprises at least one woven (advantageously deformable, for example a jersey knit) comprising co-mingled yarns in the warp and in the weft.

The composite structure may comprise or consist of one or more layers of organic and/or reinforcing substance. For example, it may comprise one or more wovens, possibly different, this complex composite structure making it possible to combine various properties of various wovens and/or may comprise one or more layers of chopped yarns and/or may comprise one or more organic films, etc. As mentioned in the definition of the invention, the assembly comprising the inflatable bag and the composite structure (and in most cases and as a preference, at least the composite structure) advantageously comprises at least one material capable of flowing under the action of pressure and heat, in addition to the reinforcing substance in the form of long fibres. The addition of a flow-capable material makes it possible, as appropriate, to form the details of the component by filling the spaces which long reinforcing fibres cannot fill, particularly when the long reinforcing fibres are in the form of a woven or array. It is thus possible to incorporate into the moulded component functions that structures simply in the form of long reinforcing fibres cannot fulfil (such as fixtures, ribs) and which are required in certain applications of moulded components and/or to obtain more homogeneous products with, as necessary, better mechanical properties.

The flow-capable material may be in the form of one or layers added to the layer or layers containing the reinforcing fibres and/or may be incorporated into the layer or layers containing the reinforcing fibres.

For example, in the case, in particular, in which the composite structure comprises a layer of reinforcing yarns in which the reinforcement content is higher than 40 or 50% by weight of the layer (it being possible for this content to extend as far as 100% when the layer consists only of reinforcing yarns), the composite structure also preferably comprises, by way of flow-capable material also allowing the reinforcing layer to slip better during moulding, at least one sheet of organic substance and/or at least one sheet of chopped yarns impregnated with organic substance added to the reinforcing layer, and as a particular preference, at least two sheets of organic substance and/or of chopped yarns impregnated with organic substance, these two sheets being placed one on each side of the reinforcing layer, the organic substance being, as appropriate, of the same kind as that present in the reinforcing layer.

When, in particular, the composite structure comprises a layer of reinforcing yarns in which the reinforcement content is below 40 to 50% by weight of the layer, the flow-capable material may be incorporated into the layer; this may, for example, therefore be an organic substance with which the reinforcing yarns are impregnated and/or, more advantageously, may be an organic substance in the form of yarns or filaments mingled with the reinforcing fibres, in the case of the use of co-mingled yarns, for example. The flow-capable material (which may combine one or possibly more different substances in one or more forms) may also partially be in the form of added layer(s) and partially in the form incorporated into the reinforcing layer or layers.

According to an advantageous embodiment, the composite structure used in the invention consists of one or more layers of composite yarn wovens and one or more layers of organic substance of the same kind as that contained in the composite yarns. According to another embodiment which is also advantageous, the structure comprises at least one composite or hybrid yarn woven and at least one web of chopped yarns (these chopped yarns comprising or consisting of composite or hybrid or reinforcing yarns, possibly impregnated with an organic substance of the same kind as that of the composite yarns, and having a length of between about 10 and 60 mm, for example). When the structure comprises at least one hybrid yarn woven and, by way of additional material capable of flowing, at least one web of chopped reinforcing yarns, the layer of reinforcements capable of flowing makes it possible to improve the moulding and obtain a more homogeneous distribution of the reinforcements throughout the parts of the component while the first layer of bound yarns of the woven type simply follows the shape of the mould to make it possible to obtain good mechanical properties. The use of a structure combining one or more layer(s) of woven reinforcements (wovens or knits, of the jersey type for example) and at least one layer of nonwoven reinforcements makes it possible to obtain products which are easy to mould and are homogeneous and have a good level of mechanical properties, and all this can be achieved all the better if the reinforcement and the organic substance within the structure used are already highly combined in the form of composite yarns. The final component may thus be of highly complex shape and the level of reinforcement may simultaneously be homogeneous and high.

The inflatable bag used in the method according to the invention must have good leaktightness and is preferably stretchy and/or deformable. It may be of the same kind (or of the same family) as the organic substance present in the structure or of a different kind and may or may not be incorporated into the final component.

According to one embodiment of the invention, use is made of an inflatable bag in the form, for example, of a tube, known as a "liner", this inflatable bag preferably being made of a substance of the same kind as the organic plastic contained in the composite structure (for example, if the substance contained in the structure is a polypropylene, the liner is preferably also made of polypropylene). If necessary, the liner is preheated to a temperature generally equal to or slightly above its softening point (for example to a temperature of the order of 150–200° C. in the case of a polypropylene liner), the composite structure being preheated at the same time and separately to a temperature generally above the softening point of the organic substance present in the structure (for example of the order of 180–250° C. in the case of polypropylene), then the structure is rolled up (preferably as a number of turns, for example three turns, so as to minimize the weld line) around the liner and the preheated liner/structure assembly is placed in a compression mould raised to a temperature below the aforementioned softening temperatures (for example of the order of 40 to 100° C. in the case of the use of a liner and a structure comprising polypropylene), the mould temperature generally being chosen to be low enough that the risks of the preheated assembly sticking to the mould are avoided. One or more needles (particularly if the component is made up of a number of separate hollow parts) are then introduced into the liner and, once the mould has been closed, the fluid for inflating the liner is injected at a pressure in excess of 40 bar.

The liner is preferably carried by a rigid support (generally of a shape suited to the component that is to be produced) while it is being preheated so as, if appropriate, to prevent it from melting under the action of the heat and allow more homogeneous heating of the liner, the support being withdrawn before the preheated liner/structure assembly is placed in the mould. The liner is preheated both so that it can stretch and allow the composite to press against the walls of the mould, and so as to allow it to be incorporated into the moulded product, if appropriate, by thermal welding (in the case of a liner which is compatible with the structure).

The liner may possibly be of a different kind from that of the organic substance of the composite structure used and/or may not require heating in order to stretch. This then is a liner made of a different polymer from the one present in the structure or of an elastomer. As a preference, however, the liner is of the same kind as the organic substance of the structure used for purposes of bonding compatibility and recycling in particular, and becomes incorporated into the finished product.

According to another embodiment of the invention, the inflatable bag is in the form of a stretchy film lining at least one of the faces of the composite structure, the preheated assembly then being obtained by heating the composite structure thus lined then rolling up the said structure so that the film is on the inside of the rolled-up structure.

According to a third embodiment of the invention, the preheated assembly is obtained by heating at least two separate composite structures each lined with at least one stretchy film on at least one of their sides then by placing the film-lined structures in such a way that the films face one another and thus form the leaktight inflatable bag (the edges of the structures being held together during moulding so as to ensure leaktightness) whilst also preventing the structures from bonding together.

The advantage of using an inflatable bag in the form of the film or films described hereinabove rather than in the form of a liner is that this or these films can be deposited directly at the time of manufacture of the structures. However, in the case of an inflatable bag in the form of film(s), this bag is preferably of a different kind from the organic substance of the structure or structures so that it can soften when the structures are heated to stretch without in any way melting and losing its leaktightness function. For example, in the case of a structure comprising polypropylene by way of organic substance, the film may be made of polyamide or of polybutylene terephthalate.

By way of a blowing device, use is generally made of at least one blowing machine or needle-type injection machine. The fluid for inflating the bag is generally injected using a needle but may, depending on the dimensions of the component and the number of hollow parts, be injected using a number of needles. Also there is the possibility of using a number of inflatable bags, just one inflatable bag being used, however, in the general case and as a preference. The blowing needle or needles are positioned correctly inside the inflatable bag (or possibly inflatable bags) after the preheated assembly has been inserted in the mould. According to the invention, the blowing is at a pressure in excess of 40 bar, the pressure remaining below 420 bar and in most cases lower than 80 bar and advantageously being lower than the pressure needed to form the same solid part by a compression process.

In general, the fluid injected is a gas, for example air or nitrogen to limit oxidation. The gas is removed as soon as the component is cool enough no longer to deform, the removal of the air or the nitrogen being by the same path as the blowing and/or by means of a purge.

During the blowing, it is essential that the edges of the preheated assembly be squeezed together either at the two ends, in the case of a structure rolled up on a liner or of a rolled structure lined with a film, or at the periphery if there are at least two separate structures with the films facing each other.

If there is the desire to equip the hollow composite component with a filling, for example a foam, the injection of air or nitrogen may possibly be replaced with the injection of polymer in the form of a low-density foam.

Moulding is preferably achieved in a steel mould which perfectly reproduces the desired shape. The mould temperature is chosen so as to encourage the flow-capable substance to flow and to encourage the composite to fill the complex shapes of the mould cavity. The moulding times are generally dependent on the thickness of the component (of the order of 8 to 10 seconds per millimeter of thickness). During this time, the blowing pressure is kept constant and the component cools because of the lower temperature of the mould. The pressure is then removed (when the component is rigid enough to handle) then the needle or needles are withdrawn from inside the component before the mould is opened. After the mould has been opened, the hollow component is released from the mould and any flash or sprue is removed, or is cut to its final dimensions.

BRIEF DESCRIPTION OF THE DRAWINGS

Other advantages and features of the invention will be brought to light in the description which follows, with reference to the drawings which illustrate three advantageous embodiments of the present invention, these embodiments being illustrative but non-limiting, in which;

FIGS. 3$a$–3$g$ show a third embodiment of the present invention.

DESCRIPTION OF THE PREFERRED EMBODIMENTS

Figure 1A:
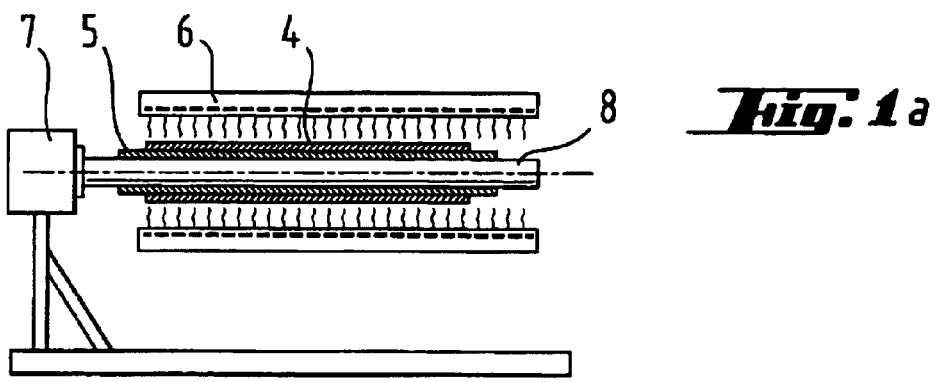
FIGS. 1$a$–1$i$ show a first embodiment of the present invention.
Figure 1B:
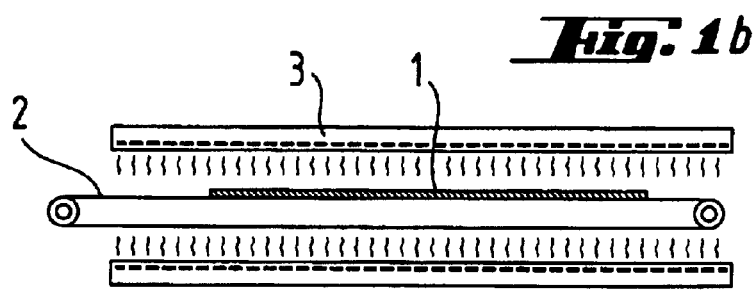
Figure 1C:
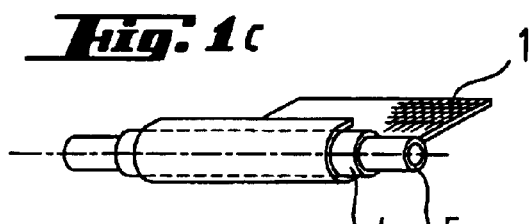
Figure 1D:
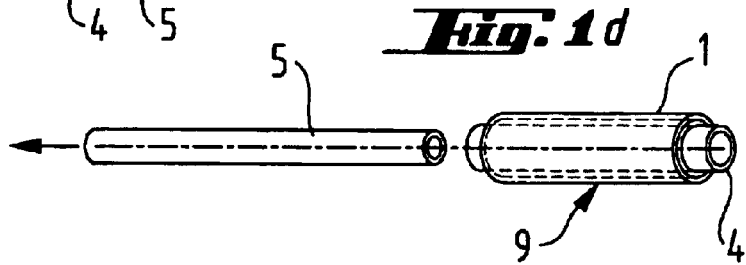
Figure 1E:
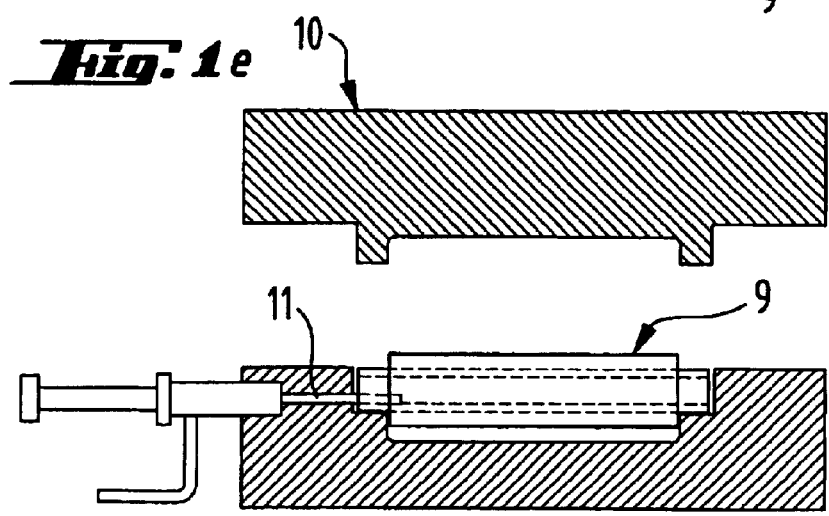
Figure 1F:
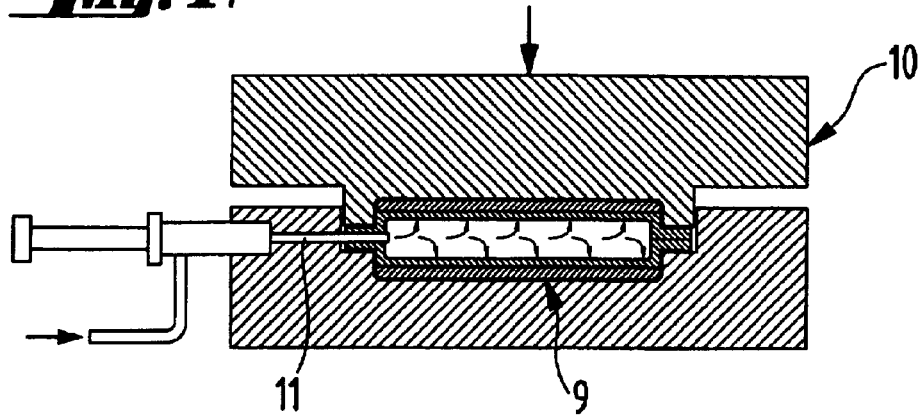
Figure 1G:
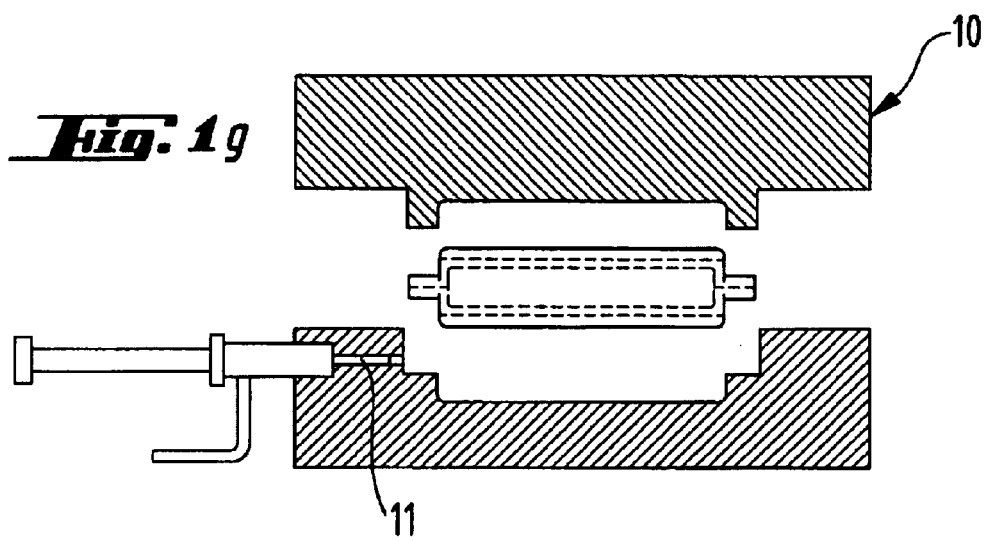
Figure 1H:
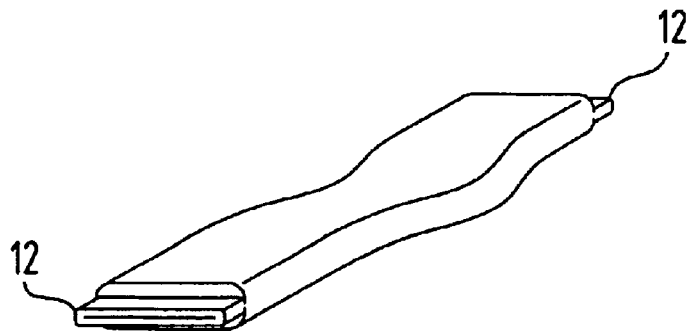
Figure 1I:

The parts (a), (b), (c), (d), (e), (f) and (g) of FIG. 1 are a very diagrammatic depiction of the various stages of a method according to the present invention. In this method, a woven 1 made up of glass filaments and filaments of organic thermoplastic (for example polypropylene), these filaments being closely mingled, is deposited on a support 2 and preheated in a hot-air or infrared radiation oven or tunnel 3 (part b). At the same time (part a), a liner 4 in the form of a tube (for example made of polypropylene) carried by a rigid support 5 is preheated in an oven 6, the rigid support being rotated by a motor 7 and a shaft 8 in order to have homogeneous preheating. The woven 1 is then wound around the liner 4 (part c), the rigid support 5 withdrawn (part d) and the preheated liner/structure assembly 9 is placed in a heated compression mould 10. A needle 11 is then introduced into the liner (part e) and after the mould has been closed, air is injected into the liner at a pressure in excess of 40 bar (part f). Once the moulded component is solidified, the air is removed, the mould is opened and the composite component is removed from the mould (part g). This then, for example, yields the component as depicted at part h, this component having a hollow central section, as depicted at part i and joined edges 12 which can act as fixings for the component or may possibly be cut off to keep only the hollow section part.

Figure 2A:
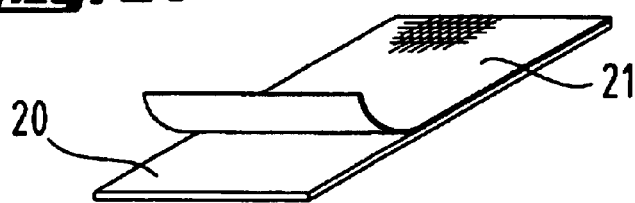
FIGS. 2$a$–2$g$ show a second embodiment of the present invention.
Figure 2B:
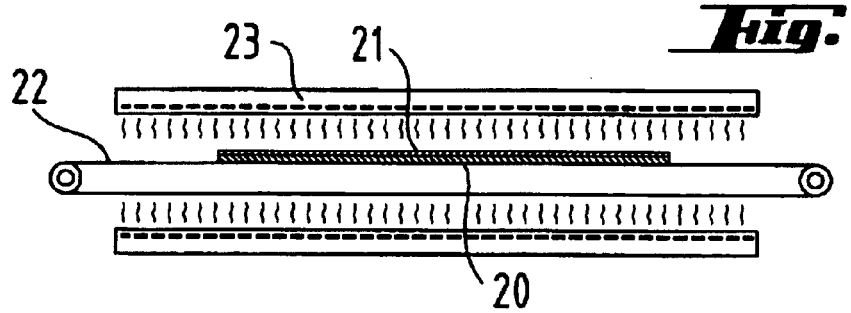
Figure 2C:
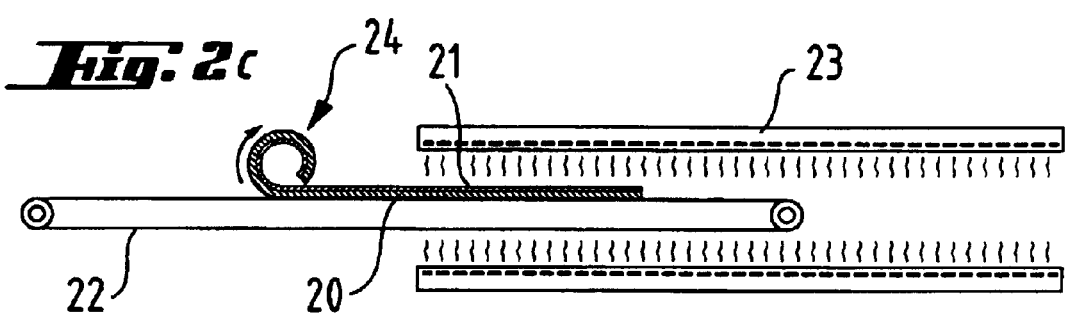
Figure 2D:
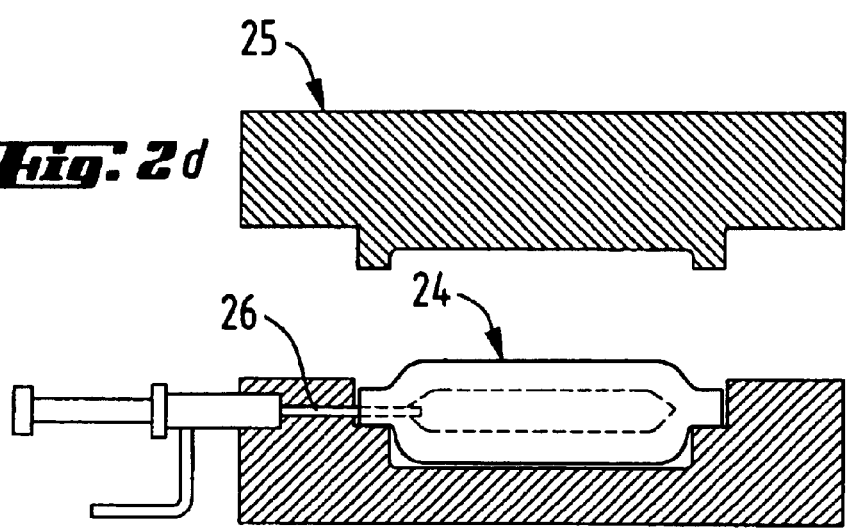

Parts (a), (b), (c), (d), (e), (f) and (g) in FIG. 2 are a very diagrammatic depiction of the various stages of a second embodiment of the method according to the present invention. In this method, a woven 20 consisting of composite glass/organic thermoplastic yarns and lined on one of its faces with a leaktight film 21 (part a in FIG. 2) is placed on a support 22 and is then preheated in an oven 23 (part b) before being rolled up on itself so that the film is on the inside (part c). The preheated woven/film assembly 24 is placed in a heated compression mould 25. A needle 26 is then introduced into the assembly (part d), and once the mould has been closed, air is injected at a pressure in excess of 40 bar (part e). Once the moulded component has solidified, the air is removed, the mould is opened and the composite component is withdrawn from the mould (part f). This then, for example, yields the component, the cross section of which is depicted as part g.

Parts (a), (b), (c), (d), (e), (f) and (g) in FIG. 3 are a very diagrammatic depiction of the various stages of a third embodiment of the method according to the present invention. In this method, two wovens 30, of the kind depicted in Figure a, these wovens each consisting of composite glass/organic thermoplastic yarns and each lined on one of their sides with a leaktight film 31 are placed on a support 32 then preheated in an oven 33 (part b). On leaving the oven (part c), the wovens are joined in such a way that the films face each other and thus form the leaktight inflatable bag (the edges 34 of the wovens being held joined together during moulding so as to ensure leaktightness) and the preheated wovens with films assembly is placed in a heated compression mould 35. A needle 36 is then introduced into the assembly (part d) and after the mould has been closed, air is injected at a pressure in excess of 40 bar (part e) After the moulded component has solidified, the air is removed, the mould is opened and the composite component is removed from the mould (part f). This then, for example, yields the component, the cross section of which is depicted as part g, this component having a hollow section and protruding edges 37, it being possible for these edges to fulfil certain functions (for example they may act as fixings or as stiffeners for the component) or they may be trimmed off.

The moulded items that can be produced using the method according to the invention are, for example, bumper beams, protective spars, energy absorbers for motor vehicles, structural components for boats, support girders, car door box sections, car floors or rear parcel shelves for cars, etc.

What is claimed is:

1. A method for manufacturing a hollow composite product, comprising:
    forming a preheated liner;
    forming a preheated composite structure, the composite structure comprising at least one reinforcing substance in a form of fibers of at least 1 mm in length and at least one material configured to flow;
    combining the preheated composite structure and the preheated liner to form a preheated assembly;
    placing the preheated assembly in a mold; and
    inflating the liner to a pressure in excess of 40 bar so that the preheated assembly adopts a shape of the mold to produce a product.

2. A method according to claim 1, wherein the liner is inflated using a gas, the gas being removed after the product produced has solidified and before the mold is opened.

3. A method according to claim 1, wherein the liner remains incorporated with the composite structure in the product produced after solidification.

4. A method according to claim 1, wherein the liner is made of a material of a same kind as the at least one material configured to flow of the composite structure.

5. A method according to claim 1, wherein the composite structure is formed of at least one array of criss-crossed yarns.

6. A method according to claim 1, wherein the composite structure comprises reinforcing filaments or yarns at least one of intermingled with and inserted among filaments or yarns made of organic substance.

7. A method according to claim 1, wherein the composite structure comprises at least one organic thermoplastic substance or thermoset.

8. A method according to claim 1, wherein the liner is in a form of a tube around which the composite structure is wrapped after the liner tube and the composite structure have been heated, to obtain the preheated assembly.

9. A method for manufacturing a hollow composite product, comprising:
    forming a preheated assembly, the preheated assembly comprising (a) a liner film and (b) a composite structure comprising at least one reinforcing substance in a form of fibers of at least 1 mm in length and at least one material configured to flow;
    rolling up the preheated assembly so that the liner film is on an inside of the rolled-up structure;
    placing the preheated assembly in a mold; and
    inflating the liner to a pressure in excess of 40 bar so that the preheated assembly adopts a shape of the mold to produce a product.

10. A method according to claim 9, wherein the liner is inflated using a gas, the gas being removed after the product produced has solidified and before the mold is opened.

11. A method according to claim 9, wherein the liner remains incorporated with the composite structure in the product produced after solidification.

12. A method according to claim 9, wherein the liner is made of a material of a same kind as the at least one material configured to flow of the composite structure.

13. A method according to claim 9, wherein the composite structure is formed of at least one array of criss-crossed yarns.

14. A method according to claim 9, wherein the composite structure comprises reinforcing filaments or yarns at least one of intermingled with and inserted among filaments or yarns made of organic substance.

15. A method according to claim 9, wherein the composite structure comprises at least one organic thermoplastic substance or thermoset.

16. A method for manufacturing a hollow composite product, comprising:
    forming first and second preheated assemblies, each preheated assembly comprising (a) a liner film and (b) a composite structure comprising at least one reinforcing substance in a form of fibers of at least 1 mm in length and at least one material configured to flow;
    combining the first and second preheated assemblies such that the respective liner films thereof face each other to form a final preheated assembly;
    placing the final preheated assembly in a mold; and
    inflating the liner to a pressure in excess of 40 bar so that the final preheated assembly adopts a shape of the mold to produce a product.

17. A method according to claim 16, wherein the liner is inflated using a gas, the gas being removed after the product produced has solidified and before the mold is opened.

18. A method according to claim 16, wherein the liner remains incorporated with the composite structures in the product produced after solidification.

19. A method according to claim 16, wherein the liner is made of a material of a same kind as the at least one material configured to flow of the composite structures.

20. A method according to claim 16, wherein the composite structures are formed of at least one array of criss-crossed yarns.

21. A method according to claim 16, wherein the composite structures comprise reinforcing filaments or yarns at least one of intermingled with and inserted among filaments or yarns made of organic substance.

22. A method according to claim 16, wherein the composite structures comprise at least one organic thermoplastic substance or thermoset.

* * * * *

UNITED STATES PATENT AND TRADEMARK OFFICE
CERTIFICATE OF CORRECTION

PATENT NO. : 6,955,784 B1  Page 1 of 1
DATED : October 18, 2005
INVENTOR(S) : Zanella et al.

It is certified that error appears in the above-identified patent and that said Letters Patent is hereby corrected as shown below:

Title page,
Item [73], Assignee, should read -- Saint-Gobain Vetrotex France S.A.,
Chambery (FR) --.
Item [86], Filing Date, should read:
-- [86]  PCT No.:  PCT/FR00/01211
§ 371 (c)(1),
(2), (4) Date:  Jan. 7, 2002 --.

Signed and Sealed this

Third Day of January, 2006

JON W. DUDAS
*Director of the United States Patent and Trademark Office*